PULSE WIDTH DISCRIMINATOR

Filed Aug. 3, 1945 2 SHEETS—SHEET 1

PULSE RECEIVING SYSTEM

Inventor
CONRAD H. HOEPPNER
By Ralph L Chappell
Attorney

Jan. 15, 1952 C. H. HOEPPNER 2,582,251

PULSE WIDTH DISCRIMINATOR

Filed Aug. 3, 1945 2 SHEETS—SHEET 2

Inventor
CONRAD H. HOEPPNER

By Ralph L. Chappell

Attorney

Patented Jan. 15, 1952 2,582,251

UNITED STATES PATENT OFFICE 2,582,251

PULSE WIDTH DISCRIMINATOR

Conrad H. Hoeppner, Washington, D. C.

Application August 3, 1945, Serial No. 608,806

5 Claims. (Cl. 250—27)

(Granted under the act of March 3, 1883, as amended April 30, 1928; 370 O. G. 757)

This invention relates in general to electronic circuits having discriminatory response characteristics and in particular to an electronic circuit for pulse time duration discrimination.

In radio, radar, television and other electronic fields, it frequently occurs that a number of different potential variations may exist at the input to a component electronic circuit either fortuitously or by intention. If all of such variations are not to be impressed upon the component circuit, it is necessary to provide an intervening circuit with the ability to discriminate between those variations intended for ultimate application to the component circuit and those variations the effect of which would be undesirable. Some characteristic or characteristics of the potential variations must be selected as a basis for pulse discrimination and among such characteristics are time duration, polarity, rate of change and amplitude.

Given such a basis and a suitable intervening circuit, many useful applications may result. For example, a means of pulse coding is provided in which intelligence is conveyed by means of electrical impulses endowed with the chosen characteristic in the form in which it will be favored by the receiver of the message. All those electrical impulses not so endowed, whether they be deliberately introduced so as to disguise a communication for secrecy purposes or reach the receiver from man-made or natural sources so as to constitute accidental or deliberate interference, are rejected by the intervening circuit. An obvious extension of such a code pulsing system is to provide a receiver with a plurality of intervening circuits, each so constructed as to select and favor its particular type of electrical impulse. In this way a multiplicity of communication channels may be provided. The endowment of an electrical impulse with the chosen characteristic in the form in which it will be favored does not necessarily operate to prevent a variation in another characteristic which can be put to a useful purpose. Thus, a pulse which may be restricted as to its time duration so as to be favored by a pulse width discrimination circuit may also be amplitude modulated so as to convey intelligence or provide a second means of discrimination.

It is an object of this invention to provide a circuit which is responsive only to potential variations or electrical impulses exceeding in duration a predetermined duration.

It is another object of this invention to provide a circuit which is responsive only to potential variations or electrical impulses of a duration less than a predetermined duration.

It is another object of this invention to provide a circuit which is responsive only to potential variations or electrical impulses of a certain time duration and which is unresponsive to potential variations or electrical impulses of all other time durations.

It is another object of this invention to provide a circuit which can be employed between a source of potential variations or electrical impulses and the receiver thereof as an intervening circuit which shields from such receiver all variations or pulses except those having a certain definite preselected time duration.

It is another object of this invention to provide a discrimination circuit the discriminatory action of which is based upon certain definite characteristics of the applied input signal.

Other objects and features of this invention will become apparent upon a careful consideration of the following detailed description when taken together with the accompanying drawings in which.

Figure 1:
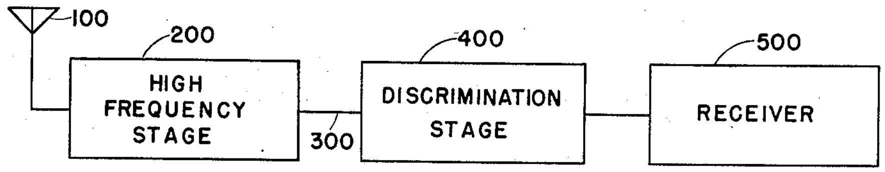
Fig. 1 is a simple block diagram of a pulse receiving system utilizing one embodiment of this invention.

Reference is now had in particular to Fig. 1 which is illustrative of a pulse receiving system wherein a discrimination circuit is employed to remove undesired video signals. Pulses or bursts of high frequency energy received by antenna 100, amplified and detected by high frequency stage 200 are impressed, in the form of the envelope of the high frequency pulses of energy, to input 300 of discrimination stage 400. Since the pulses of high frequency energy reaching antenna 100 may comprise not only a desired signal but also man-made and fortuitous interfering signals of a frequency which high frequency stage 200 will not reject, and since high frequency stage 200 may itself be a source of interfering signal, it is the function of discrimination stage 400 to shield from receiver 500 all pulses not having the time duration characteristics of the desired signal. The output circuit of high frequency stage 200, not shown, is so constructed that only signals of negative polarity and steep leading and trailing edges are applied to input 300.

In general, the pulse width discrimination taught by this invention is accomplished by the production and amplification of pulses in synchronism with the trailing edges of only those incoming pulses which have the desired duration. A means is provided which inhibits the appearance at the output terminals of the produced and amplified trailing edge pulse if the duration of the incoming pulse is too short and a means is provided which inhibits the amplification of the trailing edge pulse and hence the output pulse appearance if the incoming pulse duration is too great. A short time constant series combination of resistance and capacitance, commonly termed a differentiating circuit, is employed to provide positive pulses in synchronism with the trailing edges of incoming pulses. Circuit values are so chosen that incoming pulses must exceed a predetermined duration before the differentiation process results in positive pulses of sufficient amplitude to cause the response of the biased amplifier on which they are impressed. Another time constant circuit, this one an integrator, is employed to provide a pulse having an amplitude which is a nearly linear function of the incoming pulse duration. When the amplitude of this continually increasing pulse reaches a value corresponding to an overwidth pulse, a biasing voltage is generated which prevents the amplification of the differentiated pulse and hence the appearance of an output signal.

Figure 2:
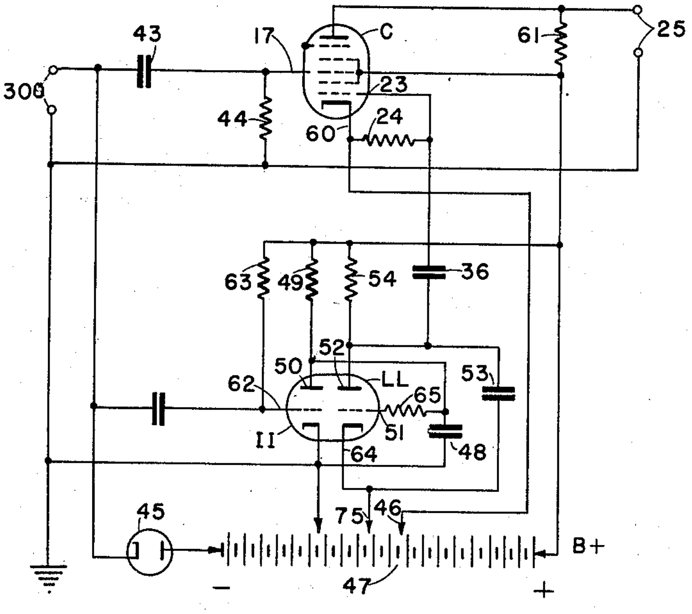
Fig. 2 is the circuit diagram of one embodiment of this invention.

In particular, capacitor 43 and resistor 44 of Fig. 2, to which reference is now had, comprise a differentiating circuit the output of which is applied to grid 17 of tube C. So as to confine the differences between signals applied to this differentiating circuit to substantially one of time duration, it is desirable to provide an amplitude limiting means at the discriminator input. Such a means eliminates variations in amplitude and is represented in Fig. 2 by diode 45. The purpose of this diode is to conduct freely when the input signal at terminals 300 exceeds a predetermined negative amplitude and thus limit the signals applied to the differentiating circuit to a uniform amplitude regardless of pulse duration. Such amplitude limiting means in the discriminator may not be provided if the preceding circuits (such as those of high frequency stage 200 of Fig. 1 for example) perform the limiting function.

Multigrid vacuum tube C of Fig. 2 has its cathode 60 so connected to the positive potential at tap 46 on power supply 47 and its grid 17 so connected to ground potential through resistor 44 that tube C is non-conducting in the quiescent condition of the circuit. On the other hand, grid 23 functions to prevent plate current flow only if there is applied to it a negative biasing signal since it is returned to cathode 60 by resistor 24.

By this arrangement, plate current flows in tube C and resistor 61 to reduce the potential difference between output terminals 25 and produce an output pulse only in the presence of a positive unbiasing signal at grid 17 and in the absence of a negative biasing signal at grid 23. In a manner explained in the following paragraphs, the differentiating circuit comprising capacitor 43 and resistor 44 functions to impress a positive unbiasing signal on grid 17 only in response to an incoming pulse at input terminals 300 having a width (time duration) which exceeds a predetermined minimum width while the integrating circuit comprising capacitor 48 and resistor 49 associated with tubes II and LL functions to impress a negative biasing signal on grid 23 only in response to an incoming pulse at input 300 having a width which exceeds a predetermined maximum width. Thus, an incoming pulse too narrow fails to unbias tube C at grid 17, whereas a pulse too wide, while unbiasing tube C at grid 17, nullifies this action by biasing off grid 23. A pulse of the proper width applied at input 300 is detected at output 25 by the negative signal which accompanies the unnullified unbiasing of grid 17 of tube C.

In tracing first the positive pulse which unbiases grid 17, it will be seen that the cutoff bias supplied to tube C may be varied by variations of the positive potential chosen for tap 46. The more positive the potential chosen, the greater must be the amplitude of the positive pulse reaching grid 17 before tube C can conduct.

Capacitor 43 and resistor 44 have been selected to provide a time constant such that the charge accumulated on capacitor 43 during the presence of an incoming pulse of the width to be favored, or greater, is equivalent to the voltage required to raise grid 17 above cutoff potential coincidental with the trailing edge of the incoming pulse. This action is such that a pulse less than a predetermined width fails to charge capacitor 43 sufficiently to permit the pulse trailing edge to render tube C conducting and produce an output signal at terminals 25. The element of underwidth discrimination is thereby introduced into the circuit of Fig. 2.

In tracing next the negative pulse which biases off tube C at grid 23 in response to an overwidth pulse, it will be seen that tube II is held normally conducting freely by the connection of its grid 62 to B+ potential through resistor 63. This free conduction by tube II provides a low potential at anode 50 and hence a negligible charge on capacitor 48. Incoming pulses at terminals 300 are of negative polarity and have steep leading and trailing edges. The limited amplitude provided by diode 45 is more than sufficient to drive grid 62 of tube II below cutoff potential and hold it there for the duration of any incoming pulses. The tendency of anode 50 is, therefore, to rise abruptly to B+ potential concident with the leading edge of an incoming pulse. This tendency is tempered, however, by the necessity of charging capacitor 48 through resistor 49 so that there appears at anode 50 a voltage which increases exponentially rather than abruptly. The values of capacitor 48 and resistor 49 have been chosen such that the exponential rise in anode 50 voltage is very nearly linear for the duration of any applied pulse. When tube II is again rendered conducting by the pulse trailing edge, capacitor 48 discharges rapidly through the low steady state resistance of tube II. In the arrangement shown, capacitor 48 and resistor 49 comprise an integrating circuit and this integrating circuit in combination with tube II forms a sawtooth generator. Thus, there appears at anode 50 in response to each applied pulse at input 300 a sawtooth pulse the amplitude of which is substantially a linear function of the width of the applied pulse.

Tube LL, having sharp cutoff characteristics, is normally held non-conducting by the connection of its cathode 64 to the positive potential at tap 75 on power supply 47. When, however, the potential at grid 51 is carried sufficiently high by anode 50 of tube II to which it is connected through resistor 65, tube LL conducts freely and an essentially rectangular negative pulse tends to appear at anode 52.

The tendency of anode 52 potential to fall and rise abruptly to form a rectangular pulse is, however, tempered by the necessity of first discharging capacitor 53 through tube LL and then charging it through resistance 54. The net effect is that, at the instant of time marked by the trailing edge of an applied pulse and hence by the unbiasing of grid 17 of tube C, capacitor 53 falls short of being fully charged to its quiescent condition. Since variations at anode 52 are coupled to grid 23 of tube C by means of the long time constant circuit comprising capacitor 36 and resistance 24, tube C is therefore biased off by grid 23 during the short interval in which grid 17 undertakes to cause plate current flow if the incoming pulse is of sufficient duration to cause tube LL to conduct. In the circuit of Fig. 2, the circuit elements are so selected and the biasing voltages so chosen that a pulse of a width greater than that to be favored by the discriminator causes tube LL to conduct. The element of overwidth discrimination is thereby introduced into the circuit of Fig. 2.

Figure 3:
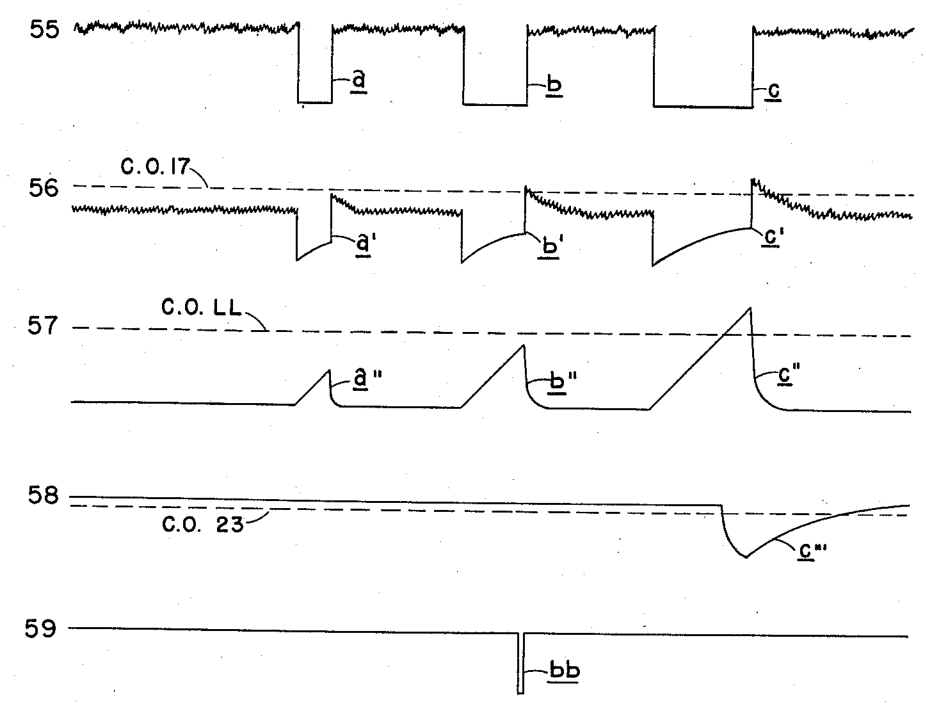
Fig. 3 is a series of waveforms useful in explaining the operation of the circuit of Fig. 2.

The foregoing underwidth and overwidth action is illustrated by the waveforms of Fig. 3 in which waveform 55 is representative of a series of amplitude limited incoming pulses *a*, *b* and *c*. Pulse *a*, upon being differentiated by the circuit comprising capacitor 43 and resistor 44, is resolved into the variations at *a'* of waveform 56. The amplitude of the positive element of *a'* is insufficient to reach the cutoff potential at grid 17 of tube C indicated by level C. O. 17 and thus tube C remains biased in response to pulse *a*. Pulse *b*, of the duration to be favored by the discriminator is likewise differentiated but this time produces variation *b'* the positive element of which exceeds level C. O. 17 and causes tube C to conduct and output pulse *bb* of waveform 59 to appear at output terminals 25. The sawtooth pulse *b''* of waveform 57 appearing at anode 50 of tube II fails to reach the amplitude necessary to unbias tube LL indicated by level C. O. LL and grid 23 therefore remains quiescent. Pulse *c*, an overwidth pulse, also impresses an unbiasing signal on grid 17 of tube C as evidenced by the positive element of pulse *c'* of waveform 56. This unbiasing is nullified, however, by the fact that pulse *c* has a duration which allows the sawtooth pulse at anode 50 of tube II to unbias LL as at *c''* of waveform 57. The unbiasing of tube LL impresses upon grid 23 of tube C the negative biasing pulse *c'''* of waveform 58 and thereby nullifies the positive trailing edge pulse at grid 17. Thus overwidth pulse *c* as well as underwidth pulse *a* fail to produce an output pulse at terminals 25 and are thereby discriminated against.

A considerable number of interesting and useful changes may be made in the embodiment shown without exceeding the spirit of the invention. For example, time constant circuits of inductance and resistance may be substituted for circuits of capacitance and resistance. Again, suitable circuit elements and potentials may be made adjustable so as to vary the limits of discrimination in a selectable manner.

Figure 4:
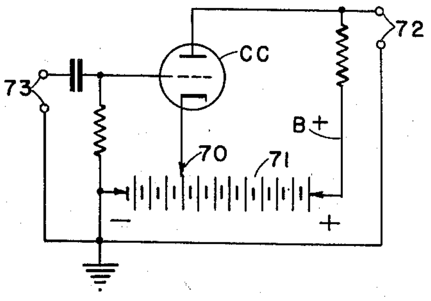
Fig. 4 is the circuit diagram of a variant embodiment of this invention.

The purely underwidth discrimination components of Fig. 2 may take the somewhat simpler form of the circuit of Fig. 4. This Fig. 4 circuit rejects all incoming pulses less than a predetermined width and favors all pulses over that width so as to produce pulses in response thereto. Such an "underwidth discriminator" may have wide applications under circumstances in which it is necessary only to prevent the response of a component circuit to all pulses of less than a given duration. An example of this is provided by radio beacon art in which it is desirable that the beacon respond only to long pulses and remain quiescent in the presence of shorter pulses transmitted for purposes other than beacon interrogation.

Tube CC of Fig. 4 is quiescently non-conducting by virtue of the positive potential maintained at its cathode by tap 70 of power supply 71. Conduction does not occur so as to produce an output signal at terminals 72 until an applied pulse exceeding in duration a predetermined value is applied to input 73. This value is determined, as in the circuit of Fig. 2 by the characteristics of the tube, the supply and biasing potentials, the time constant of the differentiator input circuit and the amplitude of the input pulses. The principles of operation are essentially the same as those described in connection with the underwidth function of the circuit of Fig. 2.

It will be apparent that a time duration or pulse width discrimination circuit constructed in accordance with the teachings of this invention will have a wide variety of applications in radio, radar, television and other electronic fields whenever discrimination between voltage variations is desirable and the time durations of such variations can be used as the basis for such discrimination. It will also be apparent that a pulse width discrimination circuit constructed as taught by this invention may be used in combination with other circuits, also discriminatory in response, whose action is based on other characteristics of the input signal such as amplitude, polarity or rate of change.

Since certain further changes may be made in the foregoing constructions and different embodiments of the inventions may be made without departing from the scope thereof, it is intended that all matter shown in the accompanying drawings is set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A pulse width discriminator comprising, a differentiating circuit having a time constant suitable to produce responsive to the trailing edges of incoming pulses, pulses having an amplitude which vary exponentially as the duration of said incoming pulses, saw-tooth generating means operative responsive to incoming pulses to produce pulses the amplitude of which increases continually for the duration of said incoming pulses, vacuum tube amplifying means having an input terminal to which the output from said differentiating circuit is applied, operative to amplify only those of said trailing edge pulses which exceed a first predetermined amplitude, and pulse generating means coupled to said amplifying means to supply disabling impulses thereto, said last named means being connected to receive and to respond to the output pulses from said saw-tooth generating means exceeding in amplitude a second predetermined amplitude to produce such disabling impulses.

2. A pulse width discriminator comprising, means limiting the amplitude of incoming pulses to a predetermined value, a differentiating circuit having a time constant suitable to produce responsive to the trailing edges of the amplitude limited incoming pulses, pulses having an amplitude which vary exponentially as the duration of said incoming pulses, saw-tooth generating means operative responsive to incoming pulses to produce pulses the amplitude of which increases continually for the duration of said incoming pulses, vacuum tube amplifying means having an input terminal to which the output from said differentiating circuit is applied, operative to amplify only those of said trailing edge pulses which exceed a first predetermined amplitude, and pulse generating means coupled to said amplifying means to supply disabling impulses thereto, said last named means being connected to receive and to respond to the output pulses from said saw-tooth generating means exceeding in amplitude a second predetermined amplitude to produce such disabling impulses.

3. A pulse width discriminator comprising, a differentiating circuit having a time constant suitable to produce responsive to the trailing edges of incoming pulses, pulses having an amplitude which vary exponentially as the duration of said incoming pulses, saw-tooth generating means operative responsive to incoming pulses to produce pulses the amplitude of which increases continually for the duration of said incoming pulses, a vacuum tube amplifier having a control element therefor to which the output of said differentiating means is connected, means regulating the bias on said amplifier to permit amplification thereby of only those of said trailing edge pulses which exceed a first predetermined amplitude, and pulse generating means coupled to said amplifying means to supply disabling impulses thereto, said last named means being connected to receive and to respond to the output pulses from said saw-tooth generating means exceeding in amplitude a second predetermined amplitude to produce such disabling impulses.

4. A pulse width discriminator comprising, a differentiating circuit having a time constant suitable to produce responsive to the trailing edges of incoming pulses, pulses having an amplitude which vary exponentially as the duration of said incoming pulses, saw-tooth generating means operative responsive to incoming pulses to produce pulses the amplitude of which increases continually for the duration of said incoming pulses, an amplifying channel having an input terminal to which the output from said differentiating circuit is applied operative to amplify only those trailing edge pulses which exceed a first predetermined amplitude, and means coupled to said amplifying channel to supply blocking pulses thereto, said last named means being further connected to receive the output pulses from said saw-tooth generating means and to respond to those saw-tooth pulses which exceed a second predetermined amplitude to produce said blocking pulses.

5. A pulse width discriminator comprising, means limiting the amplitude of incoming pulses to a predetermined value, a differentiating circuit having a time constant suitable to produce responsive to the trailing edges of the amplitude limited incoming pulses, pulses having an amplitude which vary exponentially as the duration of said incoming pulses, saw-tooth generating means operative responsive to incoming pulses to produce pulses the amplitude of which increases continually for the duration of said incoming pulses, an amplifying channel having an input terminal to which the output from said differentiating circuit is applied operative to amplify only those trailing edge pulses which exceed a first predetermined amplitude, and means coupled to said amplifying channel to supply blocking pulses thereto, said last named means being further connected to receive the output pulses from said saw-tooth generating means and to respond to those saw-tooth pulses which exceed a second predetermined amplitude to produce said blocking pulses.

CONRAD H. HOEPPNER.

REFERENCES CITED

The following references are of record in the file of this patent:

UNITED STATES PATENTS

| Number | Name | Date |
|---|---|---|
| 2,211,942 | White | Aug. 20, 1940 |
| 2,266,401 | Reeves | Dec. 16, 1941 |
| 2,275,930 | Torcheux | Mar. 10, 1942 |
| 2,359,447 | Seeley | Oct. 3, 1944 |
| 2,405,843 | Moe | Aug. 13, 1946 |
| 2,418,127 | Labin | Apr. 1, 1947 |

FOREIGN PATENTS

| Number | Country | Date |
|---|---|---|
| 214,515 | Switzerland | July 16, 1941 |
| 528,192 | Great Britain | Oct. 24, 1940 |